US012407103B2

(12) United States Patent
Qian et al.

(10) Patent No.: US 12,407,103 B2

(45) Date of Patent: Sep. 2, 2025

(54) ELECTRONIC DEVICE AND ANTENNA STRUCTURE

(71) Applicant: WISTRON NEWEB CORPORATION, Hsinchu (TW)

(72) Inventors: Zhe-You Qian, Hsinchu (TW); Shih-Chiang Wei, Hsinchu (TW); Hsieh-Chih Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 119 days.

(21) Appl. No.: 18/423,401

(22) Filed: Jan. 26, 2024

(65) Prior Publication Data

US 2024/0304991 A1 Sep. 12, 2024

(30) Foreign Application Priority Data

Mar. 8, 2023 (TW) ................................ 112108394

(51) Int. Cl.
*H01Q 5/378* (2015.01)
*H01Q 9/04* (2006.01)

(52) U.S. Cl.
CPC ........... *H01Q 5/378* (2015.01); *H01Q 9/0421* (2013.01)

(58) Field of Classification Search
CPC ...... H01Q 5/378; H01Q 9/0421; H01Q 5/328; H01Q 1/243
See application file for complete search history.

(56) References Cited

U.S. PATENT DOCUMENTS

2012/0299780 A1* 11/2012 Hsieh ........................ H01Q 9/42 343/700 MS
2018/0048076 A1* 2/2018 Wei ........................ H01Q 21/30
2021/0098878 A1* 4/2021 Wu ........................ H01Q 11/14

* cited by examiner

*Primary Examiner* — Dieu T Duong
(74) *Attorney, Agent, or Firm* — McClure, Qualey & Rodack, LLP

(57) ABSTRACT

An electronic device includes a housing and an antenna structure disposed in the housing. The antenna structure includes a grounding element, a shorting radiation element, a feeding radiation element, a radiating element, a parasitic radiation element, and a feeding element. The shorting radiation element is connected to the grounding element. The feeding radiation element includes a feeding portion, a first radiating portion, a second radiating portion, and a third radiating portion. The feeding portion is connected to the shorting radiation element, the first radiating portion, the second radiating portion, and the third radiating portion. The radiating element is connected to the grounding element. The parasitic radiation element is connected to the radiating element. The parasitic radiation element is located between the third radiating portion and the grounding element.

19 Claims, 9 Drawing Sheets

ELECTRONIC DEVICE AND ANTENNA STRUCTURE

CROSS-REFERENCE TO RELATED PATENT APPLICATION

This application claims the benefit of priority to Taiwan Patent Application No. 112108394, filed on Mar. 8, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna structure, and more particularly to an antenna structure capable of covering multiple frequency bands and an electronic device having the antenna structure.

BACKGROUND OF THE DISCLOSURE

Currently, exterior designs of electronic devices, such as notebook computers, are developed toward being thinner and more lightweight, while needing to maintain high levels of performance. Since there is a tendency for an outer appearance of the notebook computer to be designed with a narrow screen frame, an internal space of the electronic device that is available for placement of an antenna is very limited. Moreover, due to the requirement of having a narrow screen frame on the electronic device, an issue of decreasing or insufficient bandwidth is likely to occur in the antenna.

Therefore, how to design an antenna structure capable of simultaneously transmitting and receiving multiple wireless frequency bands and having good antenna efficiency within the limited internal space of the electronic device has become an important issue to be addressed in the related art.

SUMMARY OF THE DISCLOSURE

In response to the above-referenced technical inadequacy, the present disclosure provides an antenna structure and an electronic device, which can address an issue of the antenna structure not having a sufficient bandwidth due to miniaturization requirements of the electronic device.

In order to solve the above-mentioned problem, one of the technical aspects adopted by the present disclosure is to provide an electronic device, which includes a housing and an antenna structure disposed in the housing. The antenna structure includes a grounding element, a shorting radiation element, a feeding radiation element, a radiating element, a parasitic radiation element, and a feeding element. The shorting radiation element is connected to the grounding element. The feeding radiation element includes a feeding portion, a first radiating portion, a second radiating portion, and a third radiating portion. The feeding portion is connected to the shorting radiation element, the first radiating portion, the second radiating portion, and the third radiating portion. The first radiating portion extends along a first direction, the second radiating portion and the third radiating portion extend along a second direction, and the first direction is different from the second direction. The radiating element is connected to the grounding element. The parasitic radiation element is connected to the radiating element. The parasitic radiation element is located between the third radiating portion and the grounding element. The feeding element is used to feed a signal. The feeding element includes a grounding end and a feeding end, the grounding end is connected to the grounding element, and the feeding end is connected to the feeding portion.

In order to solve the above-mentioned problem, another one of the technical aspects adopted by the present disclosure is to provide an antenna structure, which includes a grounding element, a shorting radiation element, a feeding radiation element, a radiating element, and a parasitic radiation element. The shorting radiation element is connected to the grounding element. The feeding radiation element includes a feeding portion, a first radiating portion, a second radiating portion, and a third radiating portion. The feeding portion is connected to the shorting radiation element, the first radiating portion, the second radiating portion, and the third radiating portion. The first radiating portion extends along a first direction, the second radiating portion and the third radiating portion extend along a second direction, and the first direction is different from the second direction. The radiating element is connected to the grounding element. The parasitic radiation element is connected to the radiating element. The parasitic radiation element is located between the third radiating portion and the grounding element.

Therefore, in the antenna structure and the electronic device provided by the present disclosure, through the structural design of the shorting radiation element and the radiating element that are connected to the grounding element, the antenna structure can satisfy requirements for multiple frequency bands and excellent antenna properties despite miniaturization of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
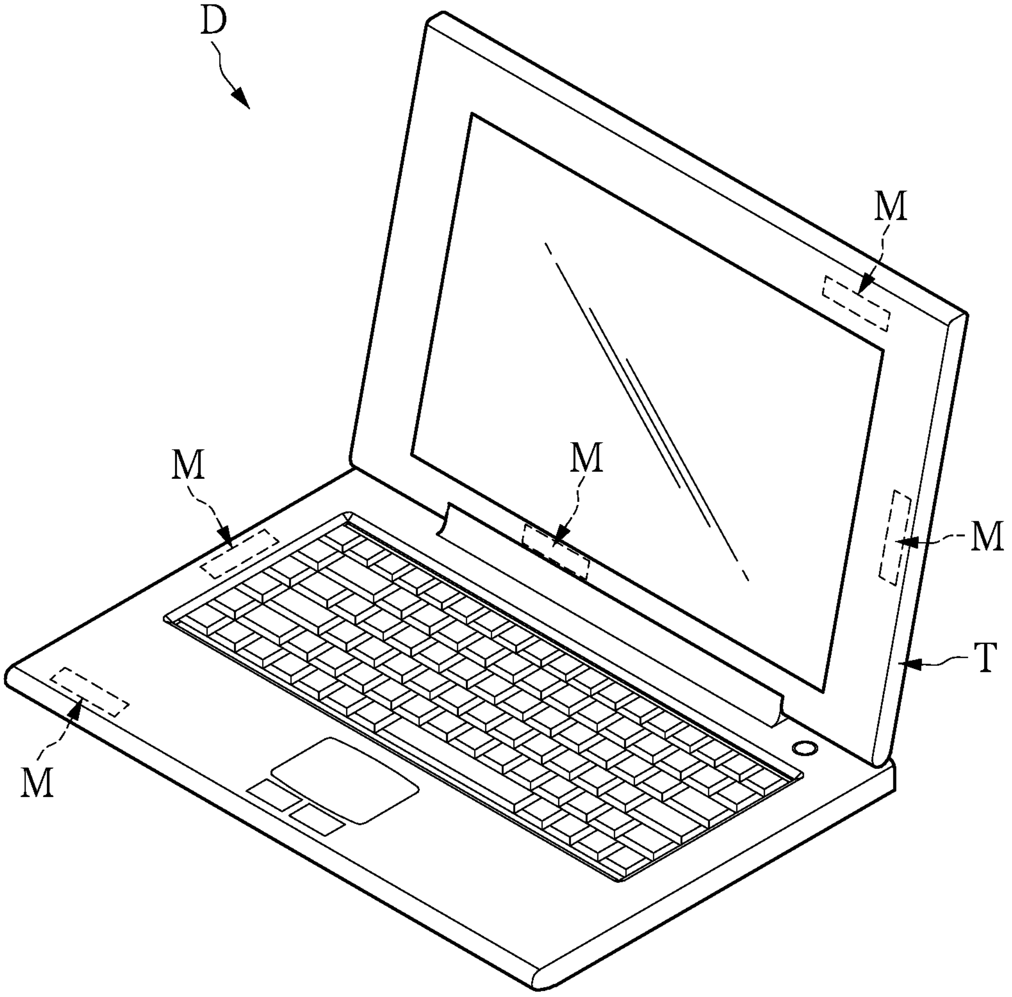
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Referring to FIG. 1, FIG. 1 is a schematic view of an electronic device according to the present disclosure. The present disclosure provides an electronic device D, and the electronic device D can be a smart phone, a tablet computer, or a notebook computer. However, the present disclosure is not limited thereto. In the present disclosure, the electronic device D is exemplified as the notebook computer. The electronic device D includes an antenna structure M and a housing T (at least one part of the housing T can be a metal housing). The electronic device D can generate at least one operating frequency band through the antenna structure M. For example, the antenna structure M is disposed at a position of a screen frame of the electronic device D, but the position and quantity of the antenna structure M in the electronic device D are not limited in the present disclosure.

First Embodiment

Figure 2:
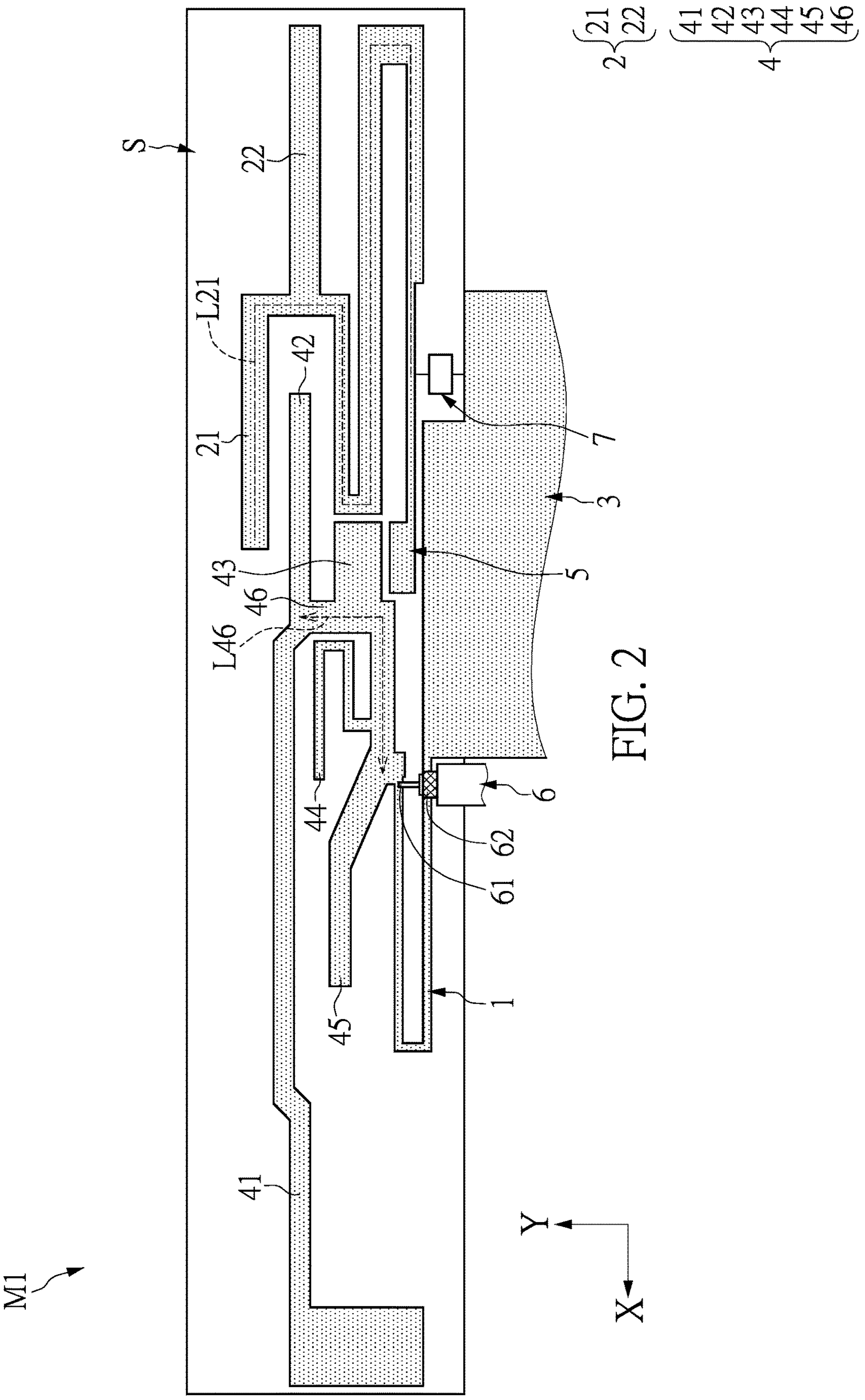
FIG. 2 is a schematic view of an antenna structure according to a first embodiment of the present disclosure.

Referring to FIG. 2, FIG. 2 is a schematic view of an antenna structure according to a first embodiment of the present disclosure. A first embodiment of the present disclosure provides an antenna structure M1, which includes a shorting radiation element 1, a radiating element 2, a grounding element 3, a feeding radiation element 4, a parasitic radiation element 5, and a feeding element 6. The shorting radiation element 1 and the radiating element 2 are connected to the grounding element 3. The feeding radiation element 4 includes a first radiating portion 41, a second radiating portion 42, a third radiating portion 43, and a feeding portion 46. The feeding portion 46 is connected to the shorting radiation element 1. The feeding element 6 includes a feeding end 61 and a grounding end 62, the feeding end 61 is connected to the feeding portion 46, and the grounding end 62 is connected to the grounding element 3. Specifically, in the first embodiment of the present disclosure, a position where the shorting radiation element 1 is connected to the feeding portion 46 is the same as a position where the feeding end 61 is connected to the feeding portion 46. Therefore, the term "shorting" in the shorting radiation element 1 indicates that a signal starts from the feeding end 61 and returns to the grounding element 3 when flowing through the shorting radiation element 1. The feeding portion 46 is L-shaped, and a length thereof is indicated by a broken line L46 in FIG. 2. The first radiating portion 41, the second radiating portion 42, and the third radiating portion 43 are connected to the feeding portion 46. The first radiating portion 41 extends along a first direction (a positive X-axis direction), the second radiating portion 42 and the third radiating portion 43 extend along a second direction (a negative X-axis direction), and the first direction is different from the second direction. As shown in FIG. 2, the parasitic radiation element 5 is connected to the radiating element 2, and the parasitic radiation element 5 is located between the third radiating portion 43 and the grounding element 3. The feeding element 6 is used to feed a signal and excite different parts of the antenna structure M1, so as to generate different operating frequencies.

The feeding radiation element 4 further includes a fourth radiating portion 44 and a fifth radiating portion 45, the fourth radiating portion 44 and the fifth radiating portion 45 are connected to the feeding portion 46, and the feeding portion 46 and the first radiating portion 41 jointly surround the fourth radiating portion 44 and the fifth radiating portion 45. The shorting radiation element 1 is more adjacent to the feeding end 61 than the radiating element 2. Moreover, one end of the shorting radiation element 1 that is connected to the feeding radiation element 4 is adjacent to the feeding end 61. It should be noted that the shorting radiation element 1 is grounded. Here, the shorting radiation element 1 can be connected not only to the grounding element 3, but also to a ground plane of a system end (such as the metal housing of the housing T). In the present disclosure, impedance matching of the antenna structure M1 can be adjusted through the configuration of the shorting radiation element 1. The radiating element 2 further includes a first arm 21 and a second arm 22. The first arm 21 is bent and adjacent to a part of the second radiating portion 42. A length of the first arm 21 is indicated by a broken line L21 in FIG. 2. The second arm 22 is connected to the first arm 21, and the second arm 22 extends along the second direction relative to the first arm 21.

Figure 3:
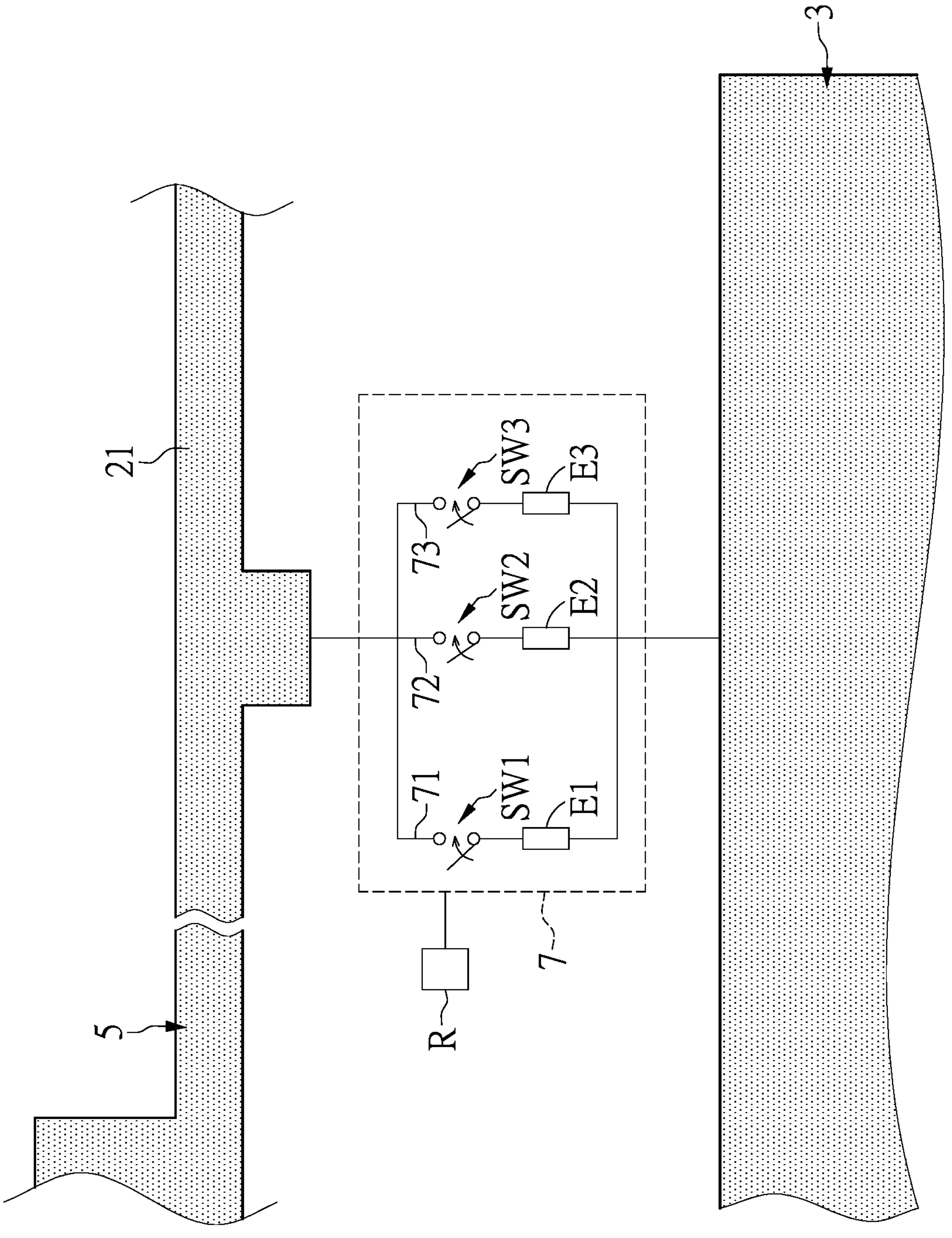
FIG. 3 is a schematic view of a switching circuit of the antenna structure according to the first embodiment of the present disclosure.

Referring to FIG. 2 and FIG. 3, FIG. 3 is a schematic view of a switching circuit of the antenna structure according to the first embodiment of the present disclosure. The antenna structure M1 further includes a switching circuit 7 that is connected between the radiating element 2 and the grounding element 3, or between the parasitic radiation element 5 and the grounding element 3, but the present disclosure is not limited thereto. The switching circuit 7 can include at least one path for signal transmission, such as a first path 71 in FIG. 3, and the first path 71 has a first switch SW1. However, a quantity of the path is not limited in the present disclosure. For example, in the first embodiment, the switching circuit 7 can further include a second path 72 and a third path 73, the second path 72 has a second switch SW2, and the third path 73 has a third switch SW3.

Moreover, the first path 71, the second path 72, and the third path 73 are respectively connected to a first passive component E1, a second passive component E2, and a third passive component E3. These passive components (the first passive component E1, the second passive component E2, and the third passive component E3) can be inductors, capacitors, or resistors, but the present disclosure is not limited thereto. For example, in the first embodiment, the first passive component E1 is the resistor having a resistance of 0 ohm. In other embodiments, the first path 71 can also be not connected to any passive component (i.e., the first path 71 is only a metal wire). An equivalent impedance of the first path 71 without being connected to any passive component is equal to the equivalent impedance of the first path 71 that is connected to the resistor having a resistance of 0 ohm. In addition, for example, the second passive component E2 can be an inductor having an inductance of 12 nH, and the third passive component E3 can be an inductor having an inductance of 15 nH. An operating frequency band, the impedance matching, a value of return loss, and radiation efficiency generated by the antenna structure M1 can be adjusted through the configuration of the first passive component E1, the second passive component E2, and the third passive component E3.

The electronic device D further includes a control circuit R, and the control circuit R can control the switching circuit 7 to switch among various modes and adjust the operating frequency bands generated by the antenna structure M1. For example, in response to the switching circuit 7 being switched to a first mode, the first switch SW1 is in a conducting state, and the second switch SW2 and the third switch SW3 are in a non-conducting state. In response to the switching circuit 7 being switched to a second mode, the second switch SW2 is in the conducting state, and the first switch SW1 and the third switch SW3 are in the non-conducting state. Therefore, the switching circuit 7 can be switched to the first mode or the second mode according to the switching state of different switches.

Since the switching circuit 7 is switched to different paths through different switching states in different modes, and different paths are respectively connected with different passive components, the equivalent impedances generated by the switching circuit 7 in different modes are also different from one another. For example, the equivalent impedance generated by the switching circuit 7 in the first mode through the first path 71 being connected to the first passive component E1 is different from the equivalent impedance generated by the switching circuit 7 in the second mode through the second path 72 being connected to the second passive component E2.

Furthermore, in response to the switching circuit 7 being switched to a third mode, the third switch SW3 is in the conducting state, and the first switch SW1 and the second switch SW2 are in the non-conducting state. The equivalent impedance generated by the switching circuit 7 in the third mode through the third path 73 being connected to the third passive component E3 is different from the equivalent impedance generated by the switching circuit 7 in the first mode through the first path 71 being connected to the first passive component E1 and the equivalent impedance generated by the switching circuit 7 in the second mode through the second path 72 being connected to the second passive component E2.

However, the aforementioned examples of the switching circuit 7 describe only one of the embodiments of the present disclosure, and the present disclosure is not intended to be limited thereto. For example, all of the switches of the switching circuit 7 can be in the non-conducting state, such that the radiating element 2 is floating on a carrier S. That is to say, the radiating element 2 and the grounding element 3 are separate from and not in contact with each other. In addition, the switching circuit 7 also includes a mode in which the switches are in the conducting state at the same time. For example, the first switch SW1 and the second switch SW2 are in the conducting state at the same time. That is, the first path 71 and the second path 72 are in the conducting state at the same time, and the two paths are connected in parallel to each other. In addition, the switching circuit 7 can also generate different modes on a single path. For example, the switching circuit 7 only has the first path 71. In response to the switching circuit 7 being switched to the first mode, the first switch SW1 is in the conducting state. In response to the switching circuit 7 being switched to the second mode, the first switch SW1 is in the non-conducting state. The aforementioned description indicates that the operating frequency band generated by the antenna structure M1 can be adjusted by different equivalent impedances generated by the switching circuit 7 in different modes.

Reference is further made to FIGS. 2 and 3. In the first embodiment, when the switching circuit 7 is switched to the first mode, the first radiating portion 41, the third radiating portion 43, and the feeding portion 46 are excited by the feeding element 6 to generate frequency ranges of from 820 MHz to 960 MHz, from 2.5 GHz to 2.69 GHz, from 4.1 GHz to 4.3 GHZ, and from 5.4 GHz to 5.6 GHz. The first radiating portion 41, the third radiating portion 43, and the feeding portion 46 can be coupled with the parasitic radiation element 5 to generate a frequency range of from 1.4 GHz to 1.6 GHz and affect a frequency offset in the frequency range of from 2.5 GHz to 2.69 GHZ. The second radiating portion 42 and the feeding portion 46 are excited to generate a frequency range of from 1.6 GHz to 1.9 GHZ, and the second radiating portion 42 and the feeding portion 46 can be coupled with the first arm 21 of the radiating element 2 to generate frequency ranges of from 734 MHz to 830 MHZ, from 2.17 GHz to 2.3 GHZ, from 3.5 GHz to 3.6 GHz, and from 4.8 GHz to 5.1 GHz. The fourth radiating portion 44 is excited to generate a frequency range of from 4.3 GHZ to 4.8 GHz. The fifth radiating portion 45 is excited to generate a frequency range of from 3.1 GHz to 3.5 GHZ. The shorting radiation element 1 is excited to generate a frequency range of from 4.8 GHz to 5.925 GHz.

Figure 9:
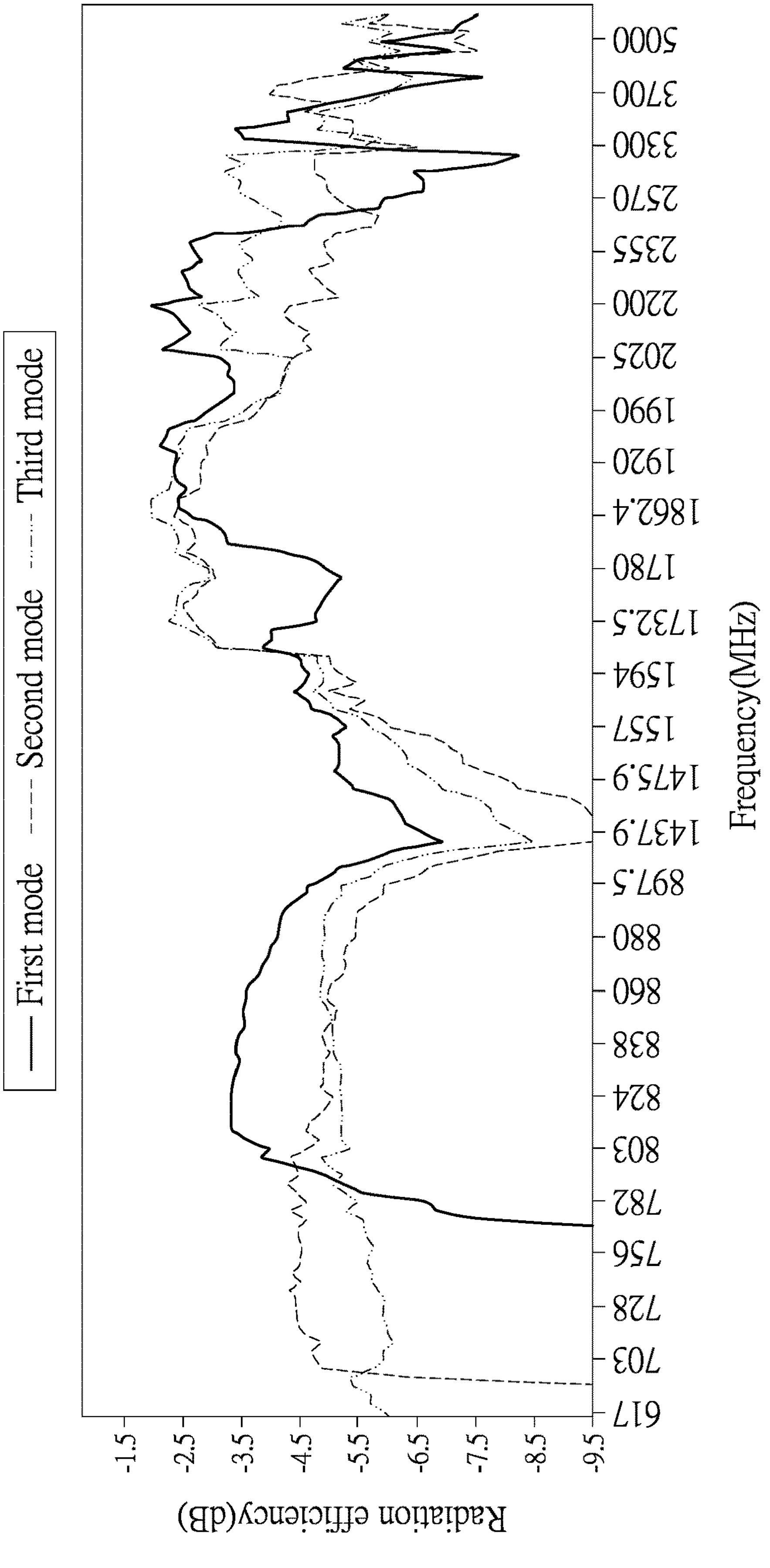
FIG. 9 is a curve diagram showing radiation efficiency of the antenna structure according to the present disclosure.

Frequency bands generated by the antenna structure M1 of the present disclosure in different modes can be as shown in FIG. 9, and FIG. 9 is a curve diagram showing radiation efficiency of the antenna structure according to the present disclosure. In response to the switching circuit 7 being switched to the first mode, the antenna structure M1 can generate a first operating frequency band covering LTE band 5 and LTE band 8. In response to the switching circuit 7 being switched to the second mode, the antenna structure M1 can generate a second operating frequency band covering LTE band 28. In response to the switching circuit 7 being switched to the third mode, the antenna structure M1 can generate a third operating frequency band covering LTE band 71.

The antenna structure M1 can utilize the switching circuit 7 to switch from the first mode to the third mode, so as to adjust a low frequency range generated by the antenna structure M1 from 960 MHz to 617 MHz (i.e., from the first operating frequency band to the third operating frequency band). Therefore, the operating frequency band generated by the antenna structure M1 can cover a low frequency range of from 617 MHz to 960 MHz and intermediate-high frequency ranges of from 1,452 MHz to 2,690 MHz and from 3,300 MHz to 5,925 MHz.

Figure 4:
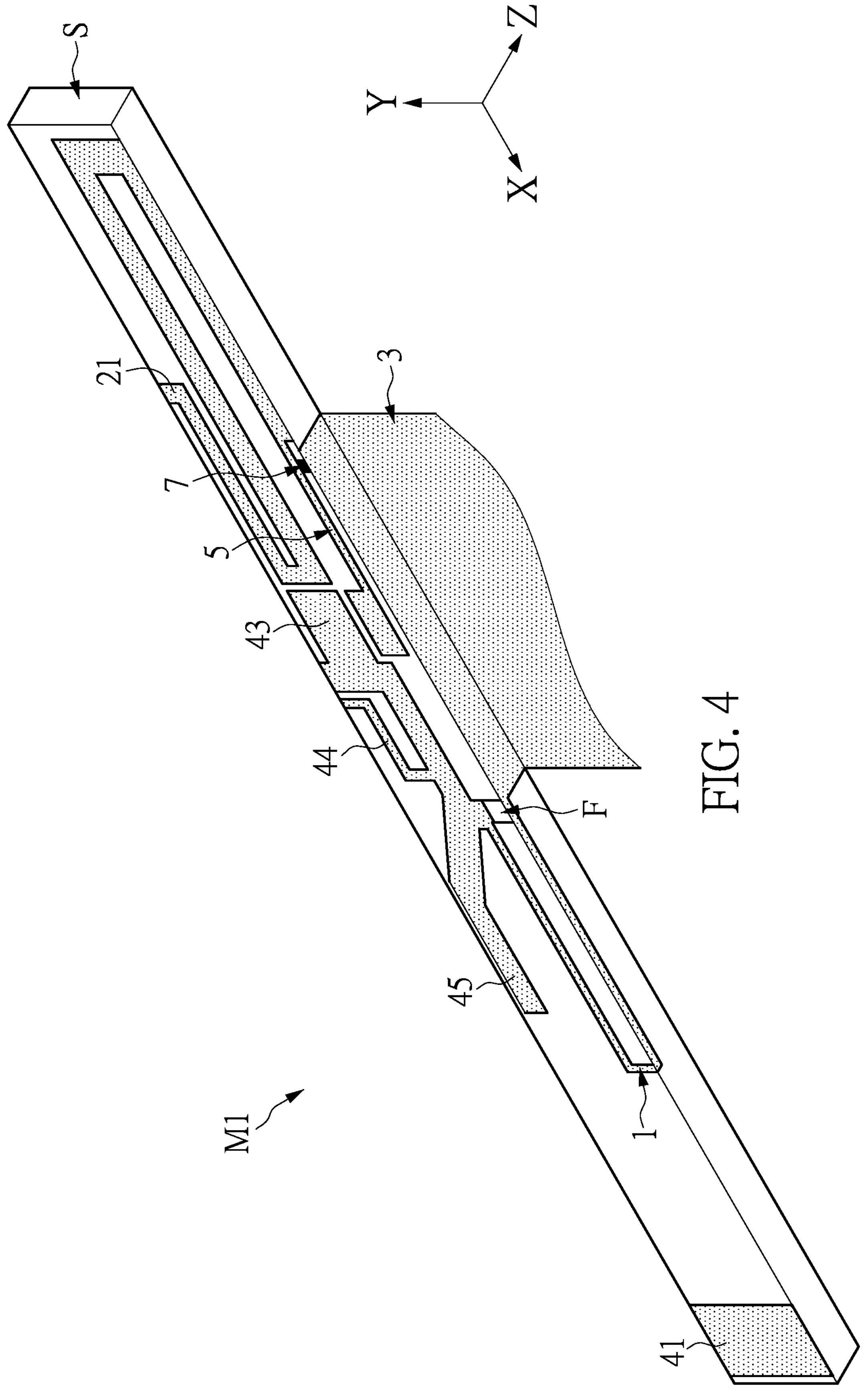
FIG. 4 is a first schematic perspective view of the antenna structure according to the first embodiment of the present disclosure.
Figure 5:
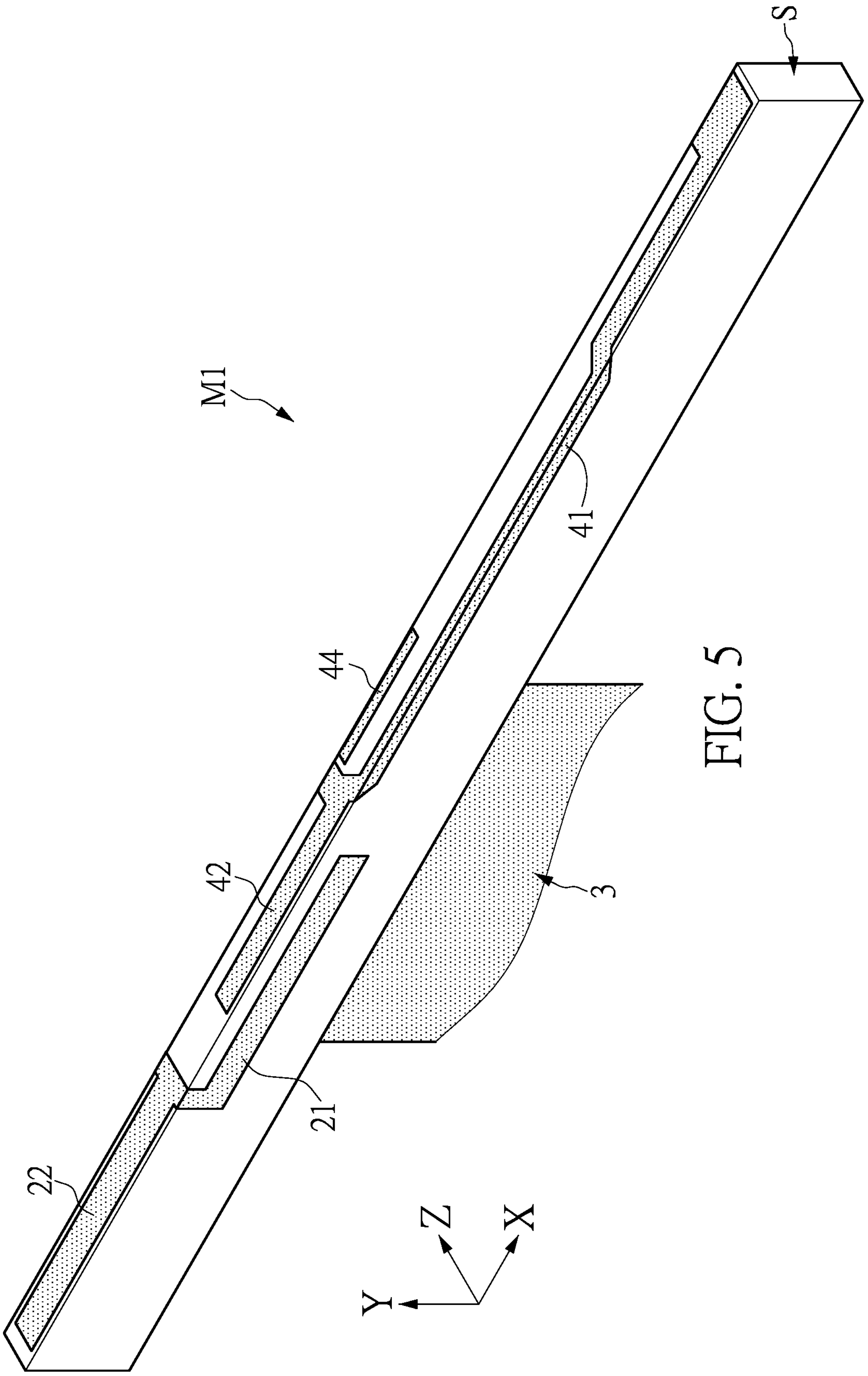
FIG. 5 is a second schematic perspective view of the antenna structure according to the first embodiment of the present disclosure.

Reference is made to FIG. 4 and FIG. 5, which are different schematic perspective views of the antenna structure M1. The appearance of the antenna structure M1 is not limited in the present disclosure. The antenna structure M1 can be disposed on the carrier S of different forms. A comparison can be made between FIG. 2 and FIGS. 4 and 5. The carrier S in FIG. 2 is a planar structure having a larger size, such that the antenna structure M1 can be displayed in a fully unfolded form when being disposed on the carrier S. The carrier S in FIGS. 4 and 5 is a three-dimensional structure having a smaller size in a Y-axis direction. It should be noted that the feeding element 6 is omitted in FIGS. 4 and 5 in order to fully present the three-dimensional structure of the antenna structure M1. Through the three-dimensional structure, the antenna structure M1 of the present disclosure can be reduced in size. This is advantageous for the antenna structure M1 to be installed in the electronic device D with a narrow-framed screen.

Second Embodiment

Figure 6:
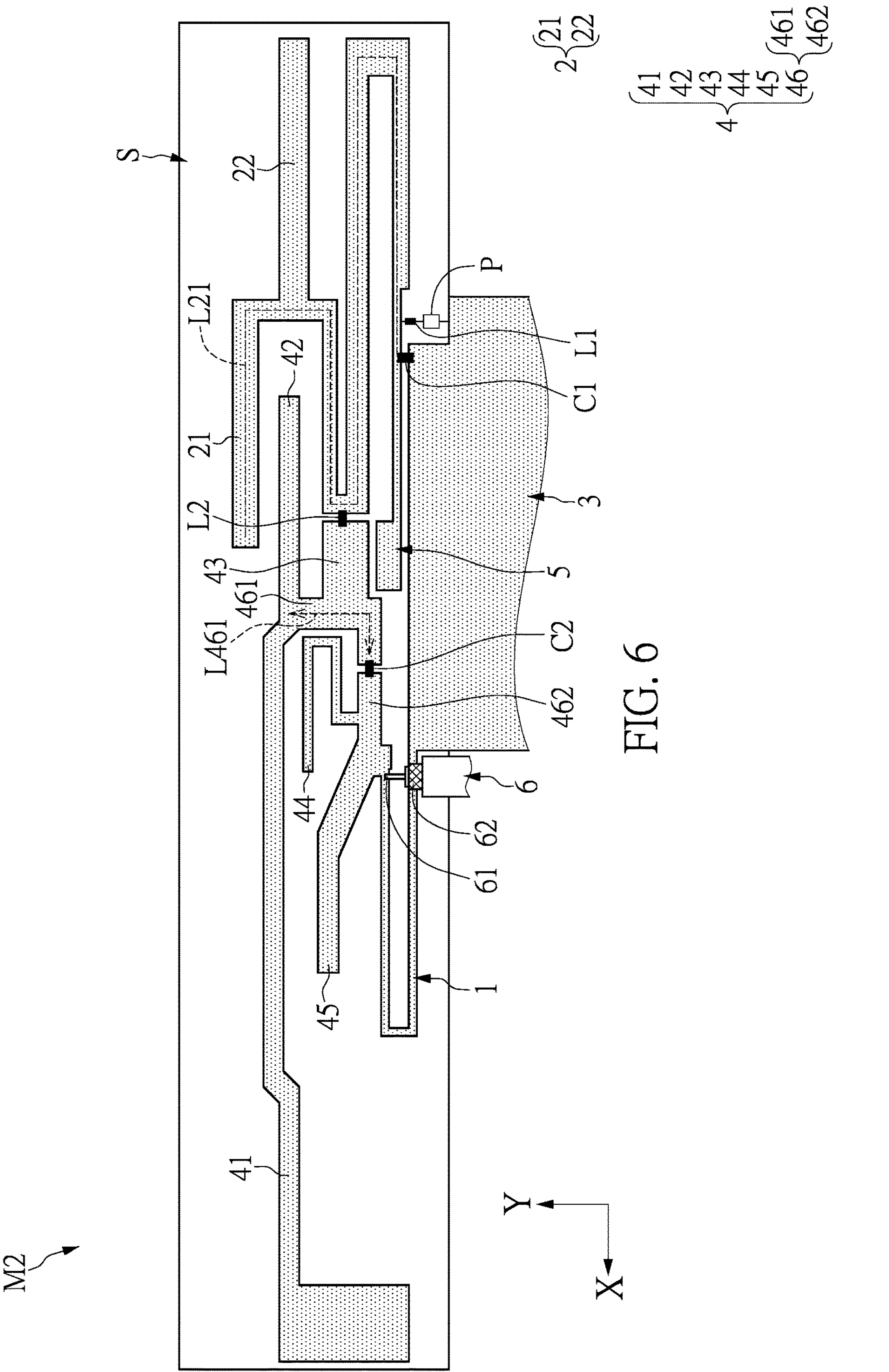
FIG. 6 is a schematic view of an antenna structure according to a second embodiment of the present disclosure.

Referring to FIG. 6, FIG. 6 is a schematic view of an antenna structure according to a second embodiment of the present disclosure. A second embodiment of the present disclosure provides an antenna structure M2, which includes a shorting radiation element 1, a radiating element 2, a grounding element 3, a feeding radiation element 4, a parasitic radiation element 5, and a feeding element 6. The antenna structure M2 shown in FIG. 6 has a structure similar to that of the antenna structure M1 shown in FIG. 2, and the similarities therebetween will not be reiterated herein. The antenna structure M2 of the second embodiment is not configured with a switching circuit. Moreover, the antenna structure M2 further includes a proximity sensing circuit P, a first inductor L1, a second inductor L2, a first capacitor C1, and a second capacitor C2. For example, an inductance of each of the first inductor L1 and the second inductor L2 is 100 nH, and a capacitance of each of the first capacitor C1 and the second capacitor C2 is 47 pF. However, the present disclosure is not limited thereto.

The proximity sensing circuit P is connected between the radiating element 2 and the grounding element 3. The first inductor L1 is connected between the proximity sensing circuit P and the radiating element 2. The first inductor L1 can serve as a RF choke to prevent a RF signal from flowing into the proximity sensing circuit P. The first capacitor C1 is connected between the radiating element 2 and the grounding element 3, or between the parasitic radiation element 5 and the grounding element 3. The first capacitor C1 is more adjacent to the parasitic radiation element 5 than the proximity sensing circuit P. The first capacitor C1 can serve as a DC block to prevent a DC signal generated by the proximity sensing circuit P from being grounded through the radiating element 2. The second inductor L2 is connected between the radiating element 2 and the third radiating portion 43. The DC signal generated by the proximity sensing circuit P can flow from the radiating element 2 to the feeding radiation element 4 through the configuration of the second inductor L2, such that an overall structure of the antenna structure M2 can form a sensing electrode (sensor pad) to measure a distance between an object (such as body parts of a user) and the antenna structure M2. As such, the electronic device D can be used to sense whether or not a human body is adjacent to the antenna structure M2. In this way, the system end of the electronic device D can control an output power of a radio frequency module (RF module, not shown in the figures) inside the electronic device D according to a sensing result of the proximity sensing circuit P, thereby preventing a specific absorption rate (SAR) at which electromagnetic wave energy is absorbed per unit mass by an organism from being too high.

The feeding portion 46 includes a first section 461 and a second section 462, and the first section 461 and the second section 462 are separate from each other. The first section 461 is L-shaped, and a length thereof is indicated by a broken line L461 in FIG. 2. The shorting radiation element 1 is connected to the second section 462. The first radiating portion 41, the second radiating portion 42, and the third radiating portion 43 are connected to the first section 461. The second capacitor C2 is connected between the first section 461 and the second section 462. The second capacitor C2 can serve as a DC block to prevent the DC signal generated by the proximity sensing circuit P from flowing into a system inside the electronic device D through the radiating element 2, the feeding radiation element 4, and the feeding element 6, and from being grounded through the shorting radiation element 1.

Third Embodiment

Figure 7:
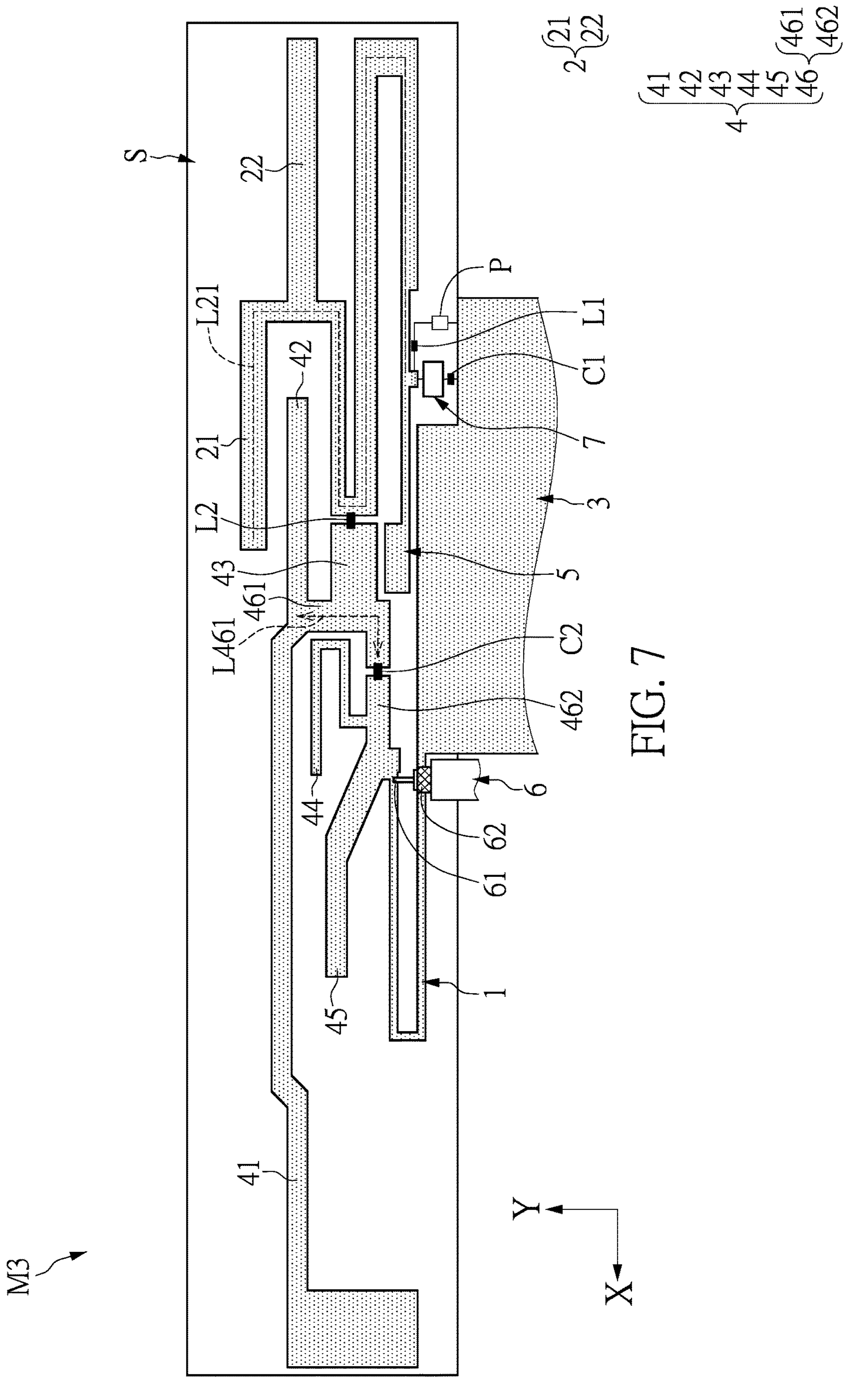
FIG. 7 is a schematic view of an antenna structure according to a third embodiment of the present disclosure.
Figure 8:
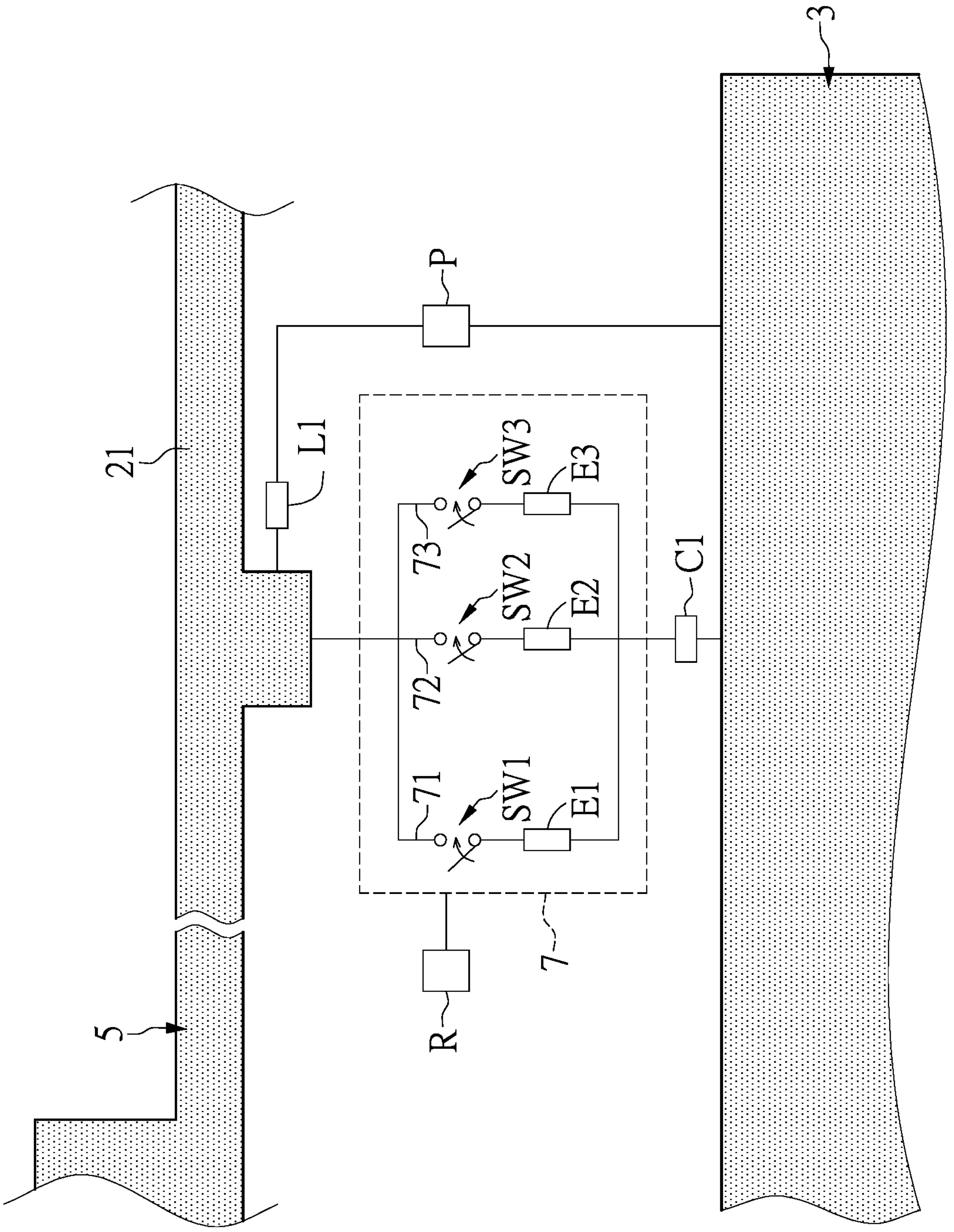
FIG. 8 is a schematic view of a switching circuit of the antenna structure according to the third embodiment of the present disclosure.

Referring to FIG. 7 and FIG. 8, FIG. 7 is a schematic view of an antenna structure according to a third embodiment of the present disclosure, and FIG. 8 is a schematic view of a switching circuit of the antenna structure according to the third embodiment of the present disclosure. A third embodiment of the present disclosure provides an antenna structure M3, which includes a shorting radiation element 1, a radiating element 2, a grounding element 3, a feeding radiation element 4, a parasitic radiation element 5, a feeding element 6, a switching circuit 7, and a proximity sensing circuit P. The antenna structure M3 further includes a first inductor L1, a second inductor L2, a first capacitor C1, and a second capacitor C2. For example, the inductance of each of the first inductor L1 and the second inductor L2 is 100 nH, and the capacitance of each of the first capacitor C1 and the second capacitor C2 is 47 pF. However, the present disclosure is not limited thereto. The antenna structure M3 shown in FIG. 7 has a structure similar to that of the antenna structure M2 shown in FIG. 6 and that of the antenna structure M1 shown in FIG. 2, and the similarities therebetween will not be reiterated herein. In the third embodiment, the proximity sensing circuit P is connected between the radiating element 2 and the grounding element 3. The first inductor L1 is connected between the proximity sensing circuit P and the radiating element 2. The first capacitor C1 is connected between the first inductor L1 and the grounding element 3. For example, the first capacitor C1 can be connected between the switching circuit 7 and the grounding element 3, or between the first inductor L1 and the switching circuit 7, but the present disclosure is not limited thereto. The first capacitor C1 can be used to prevent the DC signal generated by the proximity sensing circuit P from being grounded through the radiating element 2 and the switching circuit 7.

The second inductor L2 is connected between the radiating element 2 and the third radiating portion 43. The feeding portion 46 includes a first section 461 and a second section 462 that are separate from each other. The shorting radiation element 1 is connected to the second section 462. The first radiating portion 41, the second radiating portion 42, and the third radiating portion 43 are connected to the first section 461. The second capacitor C2 is connected between the first section 461 and the second section 462.

It should be noted that, in the third embodiment, the proximity sensing circuit P, the first inductor L1, and the first capacitor C1 are disposed outside the switching circuit 7, but the present disclosure is not limited thereto. In other embodiments, the proximity sensing circuit P, the first inductor L1, and the first capacitor C1 can be integrated into the switching circuit 7.

Beneficial Effects of the Embodiments

In conclusion, in the antenna structure and the electronic device provided by the present disclosure, by switching the switching circuit 7 from the first mode to the third mode, the low frequency range generated by the antenna structure can be adjusted from 960 MHz to 617 MHZ (i.e., from the first operating frequency band to the third operating frequency band). Hence, the operating frequency band generated by the antenna structure can cover a low frequency range of from 617 MHz to 960 MHz and intermediate-high frequency ranges of from 1,452 MHz to 2,690 MHz and from 3,300 MHz to 5,925 MHz. Through the structural design of the antenna structure provided by the present disclosure, the operating frequency bands generated by the antenna structure can cover an LTE full-band range (from 617 MHz to 5,925 MHz). Accordingly, the antenna structure provided by the present disclosure can be used as a main antenna, and antenna characteristics thereof can be further optimized to satisfy more stringent antenna specifications.

Furthermore, the antenna structure provided by the present disclosure can serve as a sensing electrode (sensor pad) to cooperate with the proximity sensing circuit P. The system end of the electronic device D can control the output power of the radio frequency module (RF module) inside the electronic device D according to the sensing result of the proximity sensing circuit P. When a user is within a predetermined detection range of the proximity sensing circuit P, the system end of the electronic device D can lower the output power of the radio frequency module, so as to prevent the specific absorption rate (SAR) from being too high (i.e., to ensure that an SAR value fits the specification). In this way, the electronic device D can be used to sense whether or not a human body is adjacent to the antenna structure M, thereby preventing the specific absorption rate (SAR) at which electromagnetic wave energy is absorbed per unit mass by an organism from being too high.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a housing; and an antenna structure disposed in the housing, wherein the antenna structure includes:

a grounding element;

a shorting radiation element connected to the grounding element;

a feeding radiation element including a feeding portion, a first radiating portion, a second radiating portion, and a third radiating portion, wherein the feeding portion is connected to the shorting radiation element, the first radiating portion, the second radiating portion, and the third radiating portion, the first radiating portion extends along a first direction, the second radiating portion and the third radiating portion extend along a second direction, and the first direction is different from the second direction;

a radiating element connected to the grounding element;

a parasitic radiation element connected to the radiating element, wherein the parasitic radiation element is located between the third radiating portion and the grounding element; and a feeding element used for feeding a signal, wherein the feeding element includes a grounding end and a feeding end, the grounding end is connected to the grounding element, and the feeding end is connected to the feeding portion.

2. The electronic device according to claim 1, wherein the feeding radiation element further includes a fourth radiating portion and a fifth radiating portion, the fourth radiating portion and the fifth radiating portion are connected to the feeding portion, and the feeding portion and the first radiating portion jointly surround the fourth radiating portion and the fifth radiating portion.

3. The electronic device according to claim 1, wherein the shorting radiation element is more adjacent to the feeding end than the radiating element.

4. The electronic device according to claim 1, wherein the radiating element includes a first arm, and the first arm is bent and adjacent to a part of the second radiating portion.

5. The electronic device according to claim 1, wherein the antenna structure further includes a switching circuit connected between the radiating element and the grounding element, or between the parasitic radiation element and the grounding element; wherein the switching circuit includes a first path, and the first path has a first switch.

6. The electronic device according to claim 5, wherein the first path further includes a first passive component, the switching circuit further includes a second path, and the second path includes a second switch and a second passive component; wherein, in response to the first switch and the second switch being turned on or off, the switching circuit is switched to a first mode or a second mode; wherein an equivalent impedance of the switching circuit in the first mode is different from the equivalent impedance of the switching circuit in the second mode.

7. The electronic device according to claim 5, wherein the antenna structure further includes a proximity sensing circuit, a first inductor, and a first capacitor, the proximity sensing circuit is connected between the radiating element and the grounding element, the first inductor is connected between the proximity sensing circuit and the radiating element, and the first capacitor is connected between the first inductor and the grounding element.

8. The electronic device according to claim 7, wherein the antenna structure further includes a second inductor and a second capacitor, the second inductor is connected between the radiating element and the third radiating portion, the feeding portion includes a first section and a second section, the shorting radiation element is connected to the second section, the first radiating portion, the second radiating portion, and the third radiating portion are connected to the first section, and the second capacitor is connected between the first section and the second section of the feeding portion.

9. The electronic device according to claim 1, wherein the antenna structure further includes a proximity sensing circuit, a first inductor, and a first capacitor, the proximity sensing circuit is connected between the radiating element and the grounding element, the first inductor is connected between the proximity sensing circuit and the radiating element, the first capacitor is connected between the radiating element and the grounding element, and the first capacitor is more adjacent to the parasitic radiation element than the proximity sensing circuit.

10. The electronic device according to claim 9, wherein the antenna structure further includes a second inductor and a second capacitor, the second inductor is connected between the radiating element and the third radiating portion, the feeding portion includes a first section and a second section, the shorting radiation element is connected to the second section, the first radiating portion, the second radiating portion, and the third radiating portion are connected to the first section, and the second capacitor is connected between the first section and the second section of the feeding portion.

11. An antenna structure, comprising:

a grounding element;

a shorting radiation element connected to the grounding element;

a feeding radiation element including a feeding portion, a first radiating portion, a second radiating portion, and a third radiating portion, wherein the feeding portion is connected to the shorting radiation element, the first radiating portion, the second radiating portion, and the third radiating portion, the first radiating portion extends along a first direction, the second radiating portion and the third radiating portion extend along a second direction, and the first direction is different from the second direction;

a radiating element connected to the grounding element; and a parasitic radiation element connected to the radiating element, wherein the parasitic radiation element is located between the third radiating portion and the grounding element.

12. The antenna structure according to claim 11, wherein the feeding portion is connected to a feeding element, and the shorting radiation element is more adjacent to the feeding element than the radiating element.

13. The antenna structure according to claim 11, wherein the radiating element includes a first arm, and the first arm is bent and adjacent to a part of the second radiating portion.

14. The antenna structure according to claim 11, further comprising a switching circuit connected between the radiating element and the grounding element, or between the parasitic radiation element and the grounding element; wherein the switching circuit includes a first path, and the first path has a first switch.

15. The antenna structure according to claim 14, wherein the first path further includes a first passive component, the switching circuit further includes a second path, and the second path includes a second switch and a second passive component; wherein, in response to the first switch and the second switch being turned on or off, the switching circuit is switched to a first mode or a second mode; wherein an equivalent impedance of the switching circuit in the first mode is different from the equivalent impedance of the switching circuit in the second mode.

16. The antenna structure according to claim 14, further comprising a proximity sensing circuit, a first inductor, and a first capacitor, wherein the proximity sensing circuit is connected between the radiating element and the grounding element, the first inductor is connected between the proximity sensing circuit and the radiating element, and the first capacitor is connected between the first inductor and the grounding element.

17. The antenna structure according to claim 14, further comprising a second inductor and a second capacitor, wherein the second inductor is connected between the radiating element and the third radiating portion, the feeding portion includes a first section and a second section, the shorting radiation element is connected to the second section, the first radiating portion, the second radiating portion, and the third radiating portion are connected to the first section, and the second capacitor is connected between the first section and the second section of the feeding portion.

18. The antenna structure according to claim 11, further comprising a proximity sensing circuit, a first inductor, and a first capacitor, wherein the proximity sensing circuit is connected between the radiating element and the grounding element, the first inductor is connected between the proximity sensing circuit and the radiating element, the first capacitor is connected between the radiating element and the grounding element, and the first capacitor is more adjacent to the parasitic radiation element than the proximity sensing circuit.

19. The antenna structure according to claim 18, further comprising a second inductor and a second capacitor, wherein the second inductor is connected between the radiating element and the third radiating portion, the feeding portion includes a first section and a second section, the shorting radiation element is connected to the second section, the first radiating portion, the second radiating portion, and the third radiating portion are connected to the first section, and the second capacitor is connected between the first section and the second section of the feeding portion.

* * * * *